United States Patent
Jahn et al.

(10) Patent No.: US 8,545,794 B2
(45) Date of Patent: Oct. 1, 2013

(54) POWDER $Ni_aM_bO_x(OH)_y$ COMPOUNDS, PROCESSES FOR MAKING THE SAME, AND USES THEREOF IN BATTERIES

(75) Inventors: Matthias Jahn, Goslar (DE); Gerd Malkowske, Goslar (DE); Stefan Malcus, Goslar (DE); Juliane Meese-Marktscheffel, Goslar (DE); Armin Olbrich, Seesen (DE); Rüdiger Zertani, Goslar (DE)

(73) Assignee: H.C. Starck GmbH (DE)

( * ) Notice: Subject to any disclaimer, the term of this patent is extended or adjusted under 35 U.S.C. 154(b) by 481 days.

(21) Appl. No.: 12/682,707

(22) PCT Filed: Sep. 2, 2008

(86) PCT No.: PCT/EP2008/061530
§ 371 (c)(1),
(2), (4) Date: Aug. 16, 2010

(87) PCT Pub. No.: WO2009/049955
PCT Pub. Date: Apr. 23, 2009

(65) Prior Publication Data
US 2010/0310869 A1      Dec. 9, 2010

(30) Foreign Application Priority Data
Oct. 12, 2007   (DE) .................. 10 2007 049 108

(51) Int. Cl.
*B01J 23/75* (2006.01)
*B01J 23/755* (2006.01)
*B01J 23/78* (2006.01)
*B01J 23/80* (2006.01)
*C01G 53/04* (2006.01)
*C01G 51/04* (2006.01)
*C01G 1/02* (2006.01)

(52) U.S. Cl.
USPC ..... 423/594.3; 423/138; 423/140; 423/594.4; 423/594.5; 423/594.6; 501/102; 501/103

(58) Field of Classification Search
USPC ................. 428/402; 502/102–103; 423/138, 423/140, 594.3, 594.4, 594.5, 594.6
See application file for complete search history.

(56) References Cited

U.S. PATENT DOCUMENTS
5,476,530 A     12/1995   Gries et al.
6,348,284 B1 *   2/2002   Bernard et al. ............... 429/223
(Continued)

FOREIGN PATENT DOCUMENTS
CA          2644955 A1    10/2007
JP       10-027611 A      1/1998
(Continued)

*Primary Examiner* — Hoa (Holly) Le
(74) *Attorney, Agent, or Firm* — Novak Druce Connolly Bove + Quigg LLP

(57) ABSTRACT

The invention relates to a powder compound of the formula $Ni_aM_bO_x(OH)_y$, wherein M represents Co and at least one element selected from the group consisting of Fe, Zn, Al, Sr, Mg, or Ca and mixtures thereof, or M represents Co Mn and Fe, wherein $0.6 \le a < 1.0$, $0 < b \le 0.4$, $0 < x \le 0.60$, and $1.4 \le y < 2$, wherein the powder compound has a particle size distribution $d_{50}$ value, measured in accordance with ASTM B 822, of <5 μm, and wherein a ratio of tap density, measured in accordance with ASTM B 527, to the particle size distribution $d_{50}$ value is at least 0.4 g/cm³. The invention also relates to a process for preparing the compound and its uses.

20 Claims, 3 Drawing Sheets

(56) References Cited

U.S. PATENT DOCUMENTS

| | | | |
|---|---|---|---|
| 6,849,208 B1 * | 2/2005 | Stoller et al. | 252/519.1 |
| 7,563,431 B2 | 7/2009 | Olbrich et al. | |
| 7,985,503 B2 * | 7/2011 | Li et al. | 429/231 |
| 2002/0053663 A1 | 5/2002 | Ito et al. | |
| 2003/0054251 A1 | 3/2003 | Ohzuku et al. | |
| 2005/0221179 A1 | 10/2005 | Baeuerlein et al. | |
| 2006/0083989 A1 * | 4/2006 | Suhara et al. | 429/231.3 |
| 2006/0089257 A1 * | 4/2006 | Albrecht et al. | 502/335 |
| 2009/0302267 A1 | 12/2009 | Albrecht et al. | |

FOREIGN PATENT DOCUMENTS

| | | |
|---|---|---|
| JP | 10-097856 A | 4/1998 |
| WO | WO-03/004418 A1 | 1/2003 |
| WO | WO-2004/032260 A2 | 4/2004 |
| WO | WO-2007/019986 A1 | 2/2007 |
| WO | WO-2007/113102 A2 | 10/2007 |

\* cited by examiner

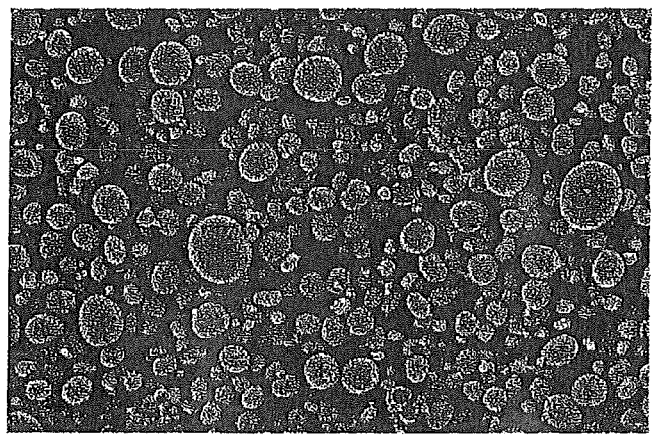
Fig 5 —— 15 μm
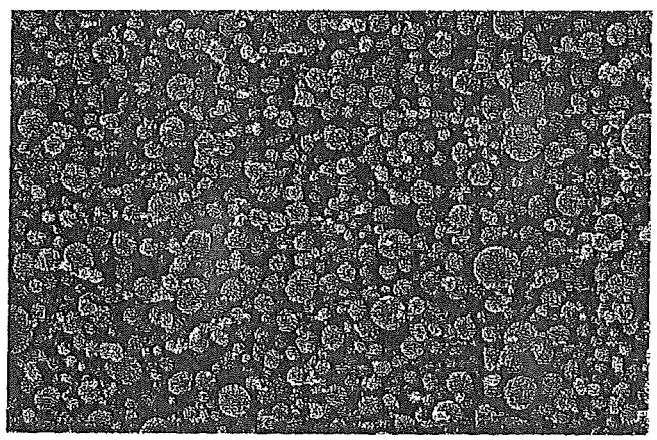
Fig 6 —— 15 μm
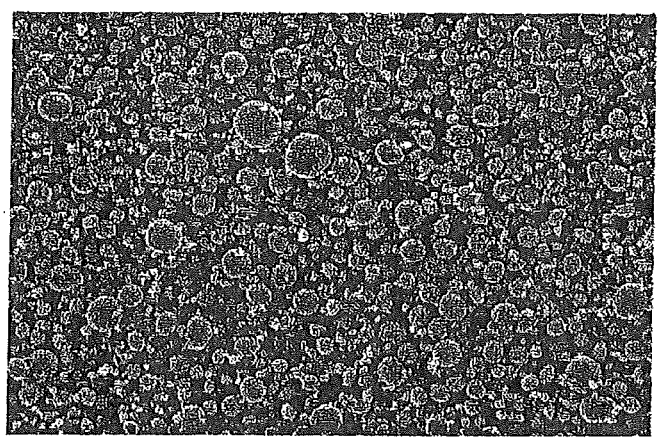
Fig 7 —— 15 μm

POWDER $Ni_aM_bO_x(OH)_y$ COMPOUNDS, PROCESSES FOR MAKING THE SAME, AND USES THEREOF IN BATTERIES

CROSS-REFERENCE TO RELATED APPLICATIONS

This application is a national stage application, under 35 U.S.C. §371, of International Application No. PCT/EP2008/061530, filed Sep. 2, 2008, which designated the U.S. and claimed priority of German Patent Application 102007049108.7, filed Oct. 12, 2007.

BACKGROUND OF THE INVENTION

The present invention relates to powdery compounds of the formulation $Ni_aM_bO_x(OH)_y$, a procedure to produce the same, and the use of the same as active material for nickel metal hydride batteries and/or as precursor for the production of lithium compounds for use in secondary lithium batteries.

JP10027611 A discloses the synthesis of a co-precipitated mixed hydroxide containing at least the two metals nickel and cobalt, but which is not limited to the aforementioned. The co-precipitated mixed hydroxide is processed further to lithium mixed metal oxides as active mass for secondary lithium batteries. The co-precipitation of the elements on the level of the precursor allows for producing lithium mixed metal oxide that will result in the electro-chemical cycle behaviour improving if the same is used in secondary lithium batteries. In this, the molar nickel share in the lithium mixed metal oxides, referring to the metal elements except for lithium, is at least 70%.

In US 2002/0053663 A1 a co-precipitated nickel cobalt manganese hydroxide is claimed that is characterised by a tap density of at least 1.5 g/cm$^3$. The co-precipitated mixed hydroxide serves as precursor for the synthesis of lithium nickel cobalt manganese oxides (LNCMO). Using processes described as "conventional" within the framework of the patent, no mixed hydroxide with a high tap density may be produced. The high tap density of the mixed hydroxide is of such high importance, because it has a positive effect on the tap density of the end product, which in turn influences the volumetric energy density in a secondary lithium battery. Within the framework of the examples powders are disclosed, the tap densities of which are between 1.71 and 1.91 g/cm$^3$. In this, the average particle size of the powders is 5-20 μm. In US 2002/0053663 A1 mixed hydroxides with high tap densities were obtained by implementing the precipitation either at inert or even at reduced conditions.

US 2003/0054251 A1 describes an optimised procedure for the synthesis of nickel- and manganese-containing mixed oxides respectively mixed hydroxides as precursors for the cathodic active mass in secondary lithium batteries. The main idea of this invention is to subject the co-precipitated mixed hydroxides (e.g. of the metals Ni, Co, Mn) already mentioned within the framework of the literature to a thermal pre-treatment at 300-500° C. before the actual oven process, in order to obtain a so-called "dry precursor". Afterwards, this dry precursor is equipped with a lithium component and converted into LNCMO by an annealing procedure. If the described, dried precursor is used instead of a (non-dried) mixed hydroxide, an end product will be obtained in accordance with this document that is characterised by an increased product consistency when compared to materials, which the non-dried mixed hydroxide is used for. The product consistency of the material has been determined by producing twenty batteries in each case with each material and by evaluating the variation of the loss of capacity between the third and the three hundredth electro-chemical cycle for these twenty batteries.

On the basis of WO003004418 it is known that the typical grain size of spherical nickel hydroxides for the use in nickel metal hydride batteries (hereafter abbreviated with NiMH) is between 5 and 15 μm. The importance of the tap density of nickel hydroxide as regards to achieving high energy densities in NiMH batteries is also described within the framework of WO003004418. A correlation between tap density and particle size is also described at this point. With its content the document JP-10-097856 aims at producing nickel hydroxides that are as dense as possible, at which the same are to be used as active material of the positive electrode of NiMH batteries. Furthermore, the nickel hydroxide is also to be characterised by a high degree of utilisation, as well as a good cycle resistance at high temperatures. The dense nickel hydroxide with tap densities of at least 2.0 g/cm$^3$ was obtained by adjusting the average particle size to a value between 5 and 20 μm, amongst others.

Within the framework of their work, Fierro et. al., J. Electrochem. Soc 153 (3) (2006), page A492-A496 also describe differently doped nickel hydroxides designed to be used as active material for NiMH batteries. For the nickel hydroxides described therein, the tap densities are above a value of 2.0 g/cm$^3$ as well, namely between 2.15 and 2.20 g/cm$^3$. Here, average grain sizes in the range of 8.3 to 12.0 μm are required to achieve such high levels of tap densities.

The nickel mixed metal hydroxides produced in accordance with the quoted state-of-the-art are used for both as raw material for the production of cathode materials for secondary lithium batteries and directly as active mass for NiMH batteries. Such secondary batteries are suitable for being used in hybrid and electric vehicles to a limited extent only. Being able to unload and load the batteries is required for both types of vehicles in order to be able to achieve high levels of acceleration and to re-convert the kinetic energy of the vehicle to electrical energy with the least possible thermal losses when decelerating the vehicle. In case of specified energy for a certain acceleration or deceleration procedure, the required loading/unloading rate, expressed in ±Δ overall capacity/Δt, is lower the higher the overall capacity of the battery. Thus, achieving a volume capacity of the battery that is as high as possible is aimed at not only on the basis of space and cost reasons, but also on the basis of electrical reasons. Furthermore, as regards to the pure electric vehicle the aforementioned as absolutely necessary, because the capacity naturally determines the action radius and the same is absolutely decisive for the marketability of these vehicles.

BRIEF SUMMARY OF THE INVENTION

The present invention relates to powdery compounds of the formulation $Ni_aM_bO_x(OH)_y$, a procedure to produce the same, and the use of the same as active material for nickel metal hydride batteries and/or as precursor for the production of lithium compounds for use in secondary lithium batteries.

Thus, the present invention has the assignment to provide materials allowing for the production of secondary batteries with high levels of volumetric energy density at a simultaneously high volumetric power density. A second assignment is to provide materials for the segment of hybrid vehicles and electric vehicles (electric vehicles, EVs, hybrid passenger cars, freight vehicles, locomotives, bicycles, motorcycles, scooters) becoming more and more important, allowing for the production of batteries providing these vehicles with huge ranges despite high acceleration values.

The assignment of the present invention is also to provide for a procedure for the production of materials for batteries and particularly secondary batteries.

The assignment is solved by means of a powdery compound of the formulation $Ni_aM_bO_x(OH)_y$ (also called NMOOH, nickel mixed metal hydroxide, or nickel mixed metal oxy-hydroxide below), at which M stands for at least one element that is selected from the group consisting of Fe, Co, Zn, Mn, Al, Mg, Ca, Sr, La, Ce, Y, Yb and/or the mixtures of the same, $0.6 \leq a < 1.0$, $0 \leq b \leq 0.4$, $0 < x \leq 0.6$, and $1.4 \leq y < 2.0$, characterised by the fact that the $d_{50}$ value of the particle size distribution, measured in accordance with ASTM B 822, is <5 μm, and that the ratio of tap density, measured in accordance with ASTM B 527, to the $d_{50}$ value of the particle size distribution is at least 0.4 $g/cm^3$.

A BRIEF DESCRIPTION OF THE FIGURES

Figure 1:
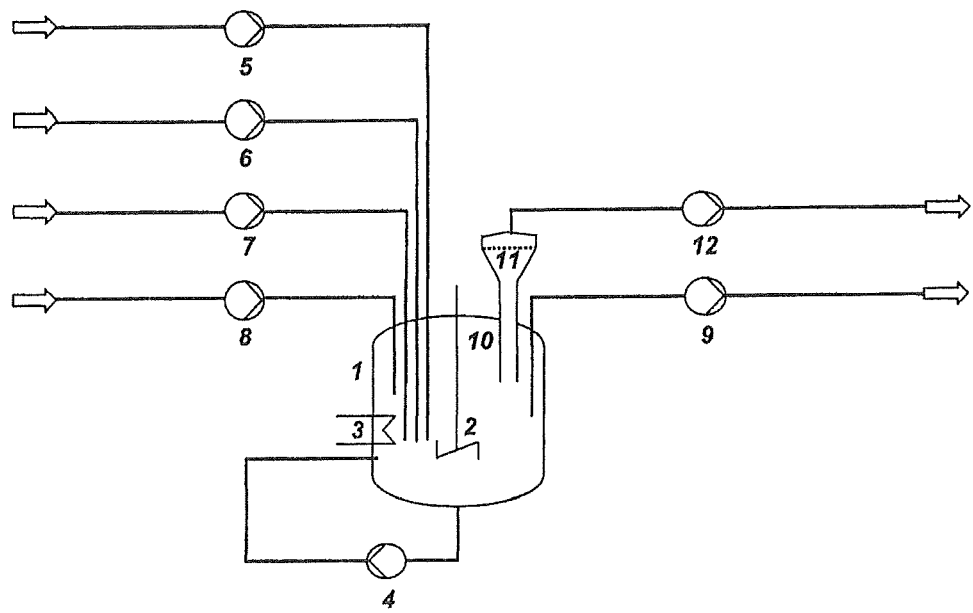
FIG. 1 shows a system which can produce the powdery compound in accordance with the invention.

FIGS. 5 and 6 show an image of the nickel mixed metal hydroxides taken with a scanning electron microscope (SEM) in an exemplary manner, at which the same have been produced in accordance with examples 1 and 2.

FIG. 7 shows an image of example 3 taken with a scanning electron microscope (SEM) in an exemplary manner.

DETAILED DESCRIPTION OF THE INVENTION

Advantageous powdery compounds in accordance with the invention are nickel mixed metal hydroxides, the $d_{50}$ value of the particle size distribution of which is <3 μm. Preferably, the powdery compounds in accordance with the invention are characterised by a ratio of tap density to $d_{50}$ value of the particle size distribution of at least 0.6 $g/cm^3$*μm, preferably at least 0.7 $g/cm^3$*μm, particularly preferably at least 0.8 $g/cm^3$*μm. The following table 1 shows examples for powdery compounds that are part of the invention, without any limiting effects.

TABLE 1

| No. | a | M | | b | x | y |
|---|---|---|---|---|---|---|
| 001 | Ni 0.984 | Co 0.016 Zn 0.000 | Mg 0.000 | 0.016 | 0.01 | 1.99 |
| 002 | Ni 0.851 | Co 0.149 Zn 0.000 | Mg 0.000 | 0.149 | 0.05 | 1.95 |
| 003 | Ni 0.800 | Co 0.200 Zn 0.000 | Mg 0.000 | 0.200 | 0.08 | 1.92 |
| 004 | Ni 0.927 | Co 0.016 Zn 0.057 | Mg 0.000 | 0.073 | 0.01 | 1.99 |
| 005 | Ni 0.925 | Co 0.016 Zn 0.057 | Mg 0.002 | 0.075 | 0.01 | 1.99 |
| 006 | Ni 0.925 | Co 0.016 Zn 0.057 | Ca 0.002 | 0.075 | 0.01 | 1.99 |
| 007 | Ni 0.919 | Co 0.024 Zn 0.057 | Mg 0.000 | 0.081 | 0.01 | 1.99 |
| 008 | Ni 0.918 | Co 0.024 Zn 0.057 | Mg 0.002 | 0.082 | 0.01 | 1.99 |
| 009 | Ni 0.917 | Co 0.024 Zn 0.057 | Ca 0.002 | 0.083 | 0.01 | 1.99 |
| 010 | Ni 0.910 | Co 0.047 Zn 0.043 | Mg 0.000 | 0.090 | 0.01 | 1.99 |
| 011 | Ni 0.908 | Co 0.047 Zn 0.043 | Mg 0.002 | 0.092 | 0.01 | 1.99 |
| 012 | Ni 0.909 | Co 0.047 Zn 0.043 | Fe 0.001 | 0.091 | 0.01 | 1.99 |
| 013 | Ni 0.676 | Co 0.156 Mn 0.167 | Fe 0.000 | 0.324 | 0.10 | 1.90 |
| 014 | Ni 0.614 | Co 0.219 Mn 0.168 | Fe 0.000 | 0.386 | 0.10 | 1.90 |
| 015 | Ni 0.672 | Co 0.078 Mn 0.250 | Fe 0.000 | 0.328 | 0.07 | 1.93 |
| 016 | Ni 0.678 | Co 0.156 Mn 0.000 | Fe 0.165 | 0.322 | 0.05 | 1.95 |
| 017 | Ni 0.669 | Co 0.000 Mn 0.167 | Fe 0.164 | 0.331 | 0.05 | 1.95 |
| 018 | Ni 0.610 | Co 0.125 Mn 0.134 | Fe 0.132 | 0.390 | 0.05 | 1.95 |
| 019 | Ni 0.733 | Co 0.139 Al 0.128 | Fe 0.000 | 0.267 | 0.20 | 1.80 |
| 020 | Ni 0.789 | Co 0.200 Sr 0.011 | Fe 0.000 | 0.211 | 0.06 | 1.94 |

The powdery nickel mixed metal hydroxides in accordance with the invention are particularly characterised by their BET surface areas. The BET surface area of the powders, measured in accordance with ASTM D 3663, is at least 5 $m^2/g$, preferably at least 7 $m^2/g$, particularly preferably at least 10 $m^2/g$.

Surprisingly and as opposed to the state-of-the-art, it has been found out that the tap density of the powdery compounds in accordance with the invention reaches very high values despite low $d_{50}$ values. The tap density of the powdery compounds in accordance with the invention, measured in accordance with ASTM B 527, is $\geq 2.0$ $g/cm^3$, preferably $\geq 2.1$ $g/cm^3$, particularly preferably $\geq 2.2$ $g/cm^3$, and very particularly preferably $\geq 2.3$ $g/cm^3$. Particularly preferred powdery compounds are characterised by an even higher tap density of $\geq 2.4$ $g/cm^3$.

The mixed metal hydroxides in accordance with the invention are characterised by a particularly broad grain size distribution. The ratio of $d_{90}/d_{50}$, at which d stands for the diameter of the powder particles, is at least 1.8, preferably at least 1.9, particularly preferably at least 2.0. Particular mixed metal hydroxides in accordance with the invention are characterised by a ratio of $d_{90}/d_{50}$ of at least 2.15.

The preferred powdery compounds in accordance with the invention are characterised by the spheroidal shape of the particles, the form factor of which takes a value of $\geq 0.8$, preferably of $\geq 0.9$, particularly preferably of $\geq 0.95$. The form factor of the particles can be determined in accordance with the method mentioned in U.S. Pat. No. 5,476,530, columns 1 and 8, and FIG. 5. This method determines a form factor of the particles that is a measure for the spheroidicity of the particles. The form factor is determined by evaluating the particle circumference, as well as the particle surface area, and by determining the diameter derived from the corresponding variable. The mentioned diameters result from the following:

$$d_U = U/\pi \quad d_A = (4A/\pi)^{1/2}$$

The form factor of the particles f is derived from the particle circumference U and from the particle surface area A, in accordance with the following:

$$f = \left(\frac{dA}{dU}\right)^2 = \left(\frac{4\pi A}{U^2}\right)$$

In case of an ideal spherical particle $d_A$ and $d_U$ have the same value and the resulting form factor would be exactly one.

FIGS. 5 and 6 show an image of the nickel mixed metal hydroxides taken with a scanning electron microscope (SEM) in an exemplary manner, at which the same have been produced in accordance with examples 1 and 2.

With values of ≥0.8 the form factors of the powdery compounds in accordance with the invention are noticeably high, given the fact that the materials are characterised by particle size distributions with $d_{50}$ values of <5.0 μm.

Furthermore, the invention relates to a new process for the production of powdery compounds consisting of the following steps:
a) Provision of at least one first and one second reactant solution,
b) Combination of at least the first and the second reactant solution in a reactor and generation of a homogeneously mixed reaction zone with a specific mechanic power input of at least 2 Watts/liter (W/L) and generation of a product suspension consisting of insoluble product and a mother liquor supersaturated on the basis of the adjustment of the liquor excess with a liquor excess of at least 0.12 mol/L.
c) Partial separation of the mother liquor from the precipitated product to adjust the solid contents of at least 150 g/L within the suspension by means of purging or filter element.

On the one hand, the high solid concentration within the suspension increases the spheroidicity of the particles and, on the other hand, it reduces the porosity of the same. Both will result in an increased tap density of the powders. Surprisingly, the powdery compounds in accordance with the invention are characterised by comparably high BET values despite the low porosities. Normally, the BET surface area is reduced strongly with a decrease in porosity. The mixed metal hydroxides in accordance with the invention have a relatively high internal pore surface area, despite the low pore volume. This means that the pore radii are significantly lower and that the number of pores is significantly higher when compared to the powders in accordance with the state-of-the-art. The high solid contents allow for the production of very fine spheroid powders with high form factors. The process in accordance with the invention is implemented preferably with solid concentrations within the suspension of at least 225 g/L, particularly preferably at least 250 g/L, very particularly preferably at least 300 g/L.

The $d_{50}$ value of the particles depends on primary and secondary nucleation. While the primary nucleation is promoted by high supersaturations, for example high excess amounts of aqueous alkali, the mechanical influence by means of particle-particle impacts respectively particle-mixer impacts is decisive for secondary nucleation. Particularly fine and spheroid particles are obtained if the excess of aqueous alkali is preferably 0.12 mol/L, particularly preferably at least 0.25 mol/L. The mechanical power input of the mixer into the suspension is particularly important for the secondary nucleation and for the formation of spheroid particles. The mechanical power input, also called specific power input below, is defined as the energy per time and volume unit transmitted by the mixer to the suspension. The specific energy input into the reactor is defined as the energy per volume unit transmitted by the mixer to the suspension. The process in accordance with the invention is implemented preferably at a specific power input of at least 2.5 W/liters (W/L), particularly preferable at least 3 W/L.

According to the procedure in accordance with the invention, nickel mixed metal hydroxides may be produced from the group of metals Fe, Co, Zn, Mn, Al, Mg, Ca, Sr, La, Ce, Y, Yb. In this, reactant solutions made of water-soluble salts of mineral acids are taken as the basis, e.g. sulphuric acid, hydrochloric acid, or nitric acid of the metals mentioned above.

The reactant solutions may be produced by dissolving the corresponding metal chlorides, metal sulphates, or metal nitrates in water or dissolving the metals in the corresponding mineral acids (first reactant solution). The aqueous alkalis are provided as watery solution in the desired concentration (second reactant solution).

The process is suitable preferably for the production of nickel mixed metal hydroxides in accordance with the invention. Water-soluble metal salts can be used as precursors, e.g. nickel sulphate, nickel nitrate, nickel chloride and/or the mixtures of the same.

The powdery compound in accordance with the invention is produced preferably in a reactor (1) shown in FIG. 1 by means of precipitation crystallisation from water nickel salt solutions at a concentration of aqueous alkalis of at least 0.12 mol/L, by adding alkali hydroxide solutions and, if applicable, ammonium, gaseous or as water solution. Sodium hydroxide and potassium hydroxide are used preferably as alkali hydroxide solutions. Although the precipitation crystallisation can be implemented in a batch-wise or semi-continuous manner, the same is implemented in a continuous manner preferably. In case of the continuous process, metal salt solution, alkali hydroxide solution, and ammonium solution are supplied to the reactor at the same time and the product suspension is extracted continuously using a free overflow or a pump. The temperature within the reaction zone of the reactor is between 20 and 90° C., preferably 40 to 70° C., particularly preferably 45 to 60° C.

The nickel mixed metal hydroxides in accordance with the invention can be produced preferably in the system shown in FIG. 1. In the following, the process in accordance with the invention will be explained in more detail.

A reactor (1) equipped with mixer (2), thermostat (3), and circulating pump (4) is initially filled with mother liquor already characterised by the salt concentration, NaOH concentration, and NH$_3$ concentration of the later stationary condition. After having commissioned the mixer, the heat tracing, and the circulating pump, the dosing pumps (5), (6), (7), and (8) are used to supply metal sulphate solution, caustic soda, ammonium, and water, if applicable. The resulting product suspension is removed from the reactor in a level-controlled manner by means of the pump (9). Furthermore, the reactor is equipped with an immersion tube (10), at which the same is equipped with a filter plate (11) at the end of a conical recess. Using the pump (12), mother liquor can be removed from the reactor with the help of this filter element. By means of the aforementioned, the solid content of the product suspension can be set independent of the reactant concentrations and the salt concentration within the mother liquor. Instead of using an immersion tube with filter element, the mother liquor can also be separated from the reaction by means of hydraulic cyclones, baffle plate thickeners, or a cross-flow filtration.

The material is collected in the stationary condition upon expiration of 5 dwell times during a period of 24 hours, filtered on a funnel filter, washed with 5 liters of water per kg, and dried up to weight consistence within the drying cabinet at temperatures of up to 90° C. in each case. In order to achieve a homogeneously mixed reaction zone within the reactor, all well-established mixer types may be used. Particularly good results can be achieved when using propeller mixers or disk mixers.

The powdery compounds in accordance with the invention are suitable as precursors for the production of secondary batteries. The powdery compounds in accordance with the invention are used as precursor for the production of lithium compounds for secondary lithium batteries. The powdery compounds are used particularly in lithium-ion cells respectively lithium polymer cells. The nickel mixed metal hydroxides in accordance with the invention can be used in a particularly advantageous manner as active material in nickel metal hydride batteries.

The secondary batteries containing the powders in accordance with the invention are particularly suitable for being used in hybrid vehicles, electric vehicles, solar vehicles, as well as in vehicles operated with fuel cells.

Furthermore, the invention is explained on the basis of the following examples and comparative examples.

EXAMPLES

All examples and comparative examples were implemented in the reactor in accordance with FIG. 1. In the following, a general description on the implementation of the examples is given.

General Description

Initially, the reactor (1) is filled with mother liquor, at which the same is characterised by the $Na_2SO_4$, the NaOH, as well as the $NH_3$ concentrations of the corresponding stationary reactor conditions. Afterwards, the mixer (2), the thermostat heating (3), and the circulating pump (4) are commissioned. After the corresponding reaction temperature has been reached, the pumps (5) to (8) controlled gravimetrically are commissioned. Pump (5) pumps metal salt solution, pump (6) pumps aqueous alkali, pump (7) pumps ammonium solution, and pump (8) pumps completely desalinated (VE) water into the reactor. Afterwards, pump (9) is started, at which the same pumps the resulting product suspension from the reactor in a level-controlled manner. Then, the gravimetrically controlled self-priming pump (12) is commissioned, at which the same disposes of an immersion tube (10) with a filter plate (11) arranged in the upper part, in order to remove the required quantity of mother liquor from the reactor system and to adjust the solid content of the suspension desired in each case.

Example 1

The reactor (1) has been filled with mother liquor, at which the same contained 133 g/L $Na_2SO_4$, 4.8 g/L NaOH, as well as 11 g/L $NH_3$ and the mixer (2) was commissioned with 1000 RPM, as well as the circulating pump (4) with 10 m³/h. Afterwards, the thermostat heating was used to increase the temperature to 50° C. After having reached the command temperature, pump (5) was used to pump 11223 g/L metal sulphate solution (79.91 g/L Ni, 20.06 g/L Co), pump (6) was used to pump 7746 g/L aqueous alkali (200 g/L NaOH), and pump (7) was used to pump 731 g/L ammonium solution (225 g/L $NH_3$) into the reactor in a gravimetrically controlled manner. Pump (12) was used to remove 8154 g/h mother liquor from the reactor by means of the immersion tube (10) with filter element (11). Pump (9) pumped an average of 11545 g/h suspension from the reactor in a level-controlled manner. After a period of 100 hours, the reactor reached its stationary condition and the suspension removed from the reactor as of this point in time was collected in a reservoir tank for a period of 24 hours. Afterwards, the same was drained onto a funnel filter and filtered. The filter cake was washed with 170 liters of VE water (completely desalinated water) and was dried for 24 hours in a drying cabinet at 85° C. on trays afterwards. In the end, 34.4 kg of the dried product with the following properties were obtained:

50.5% NI, 12.8% Co

Particle size distribution (PGV) ($d_{10}$: 1.4 µm, $d_{50}$: 4.9 µm, $d_{90}$: 9.7 µm), $d_{90}/d_{50}$: 1.98

Tap density (KD): 2.22 g/cm³

$KD/d_{50}$: 0.45 g/cm³*µm

BET: 7.3 m²/g

Comparative Example 1

The reactor (1) has been filled with mother liquor, at which the same contained 133 g/L $Na_2SO_4$, 4.8 g/L NaOH, as well as 11 g/L $NH_3$ and the mixer (2) was commissioned with 600 RPM, as well as the circulating pump (4) with 10 m³/h. Afterwards, the thermostat heating was used to increase the temperature to 50° C. After having reached the command temperature, pump (5) was used to pump 6328 g/L metal sulphate solution (79.91 g/L Ni, 20.06 g/L Co), pump (6) was used to pump 4367 g/L aqueous alkali (200 g/L NaOH), and pump (7) was used to pump 412 g/L ammonium solution (225 g/L $NH_3$) into the reactor in a gravimetrically controlled manner. Pump (9) pumped an average of 11107 g/h suspension from the reactor in a level-controlled manner. After a period of 100 hours, the reactor reached its stationary condition and the suspension removed from the reactor as of this point in time was collected in a reservoir tank for a period of 24 hours. Afterwards, the same was drained onto a funnel filter and filtered. The filter cake was washed with 100 liters of VE water and was dried for 24 hours in a drying cabinet at 85° C. on trays afterwards. In the end, 19.3 kg of the dried product with the following properties were obtained:

50.8% NI, 12.7% Co

Particle size distribution (PGV) ($d_{10}$: 5.8 µm, $d_{50}$: 14.8 µm, $d_{90}$: 26.2 µm), $d_{90}/d_{50}$: 1.77

Tap density (KD): 2.28 g/cm³

$KD/d_{50}$: 0.150 g/cm³*µm

BET: 14.9 m²/g

In the following table 2, the reactor parameters and the properties of the obtained products from example 1 and comparative example 1, as well as the further examples and comparative examples are shown in a summarised manner.

TABLE 2

| Reference sign | | Example 1 | Example 2 | Example 3 | Comparative example 1 | Comparative example 2 | Example 4 |
|---|---|---|---|---|---|---|---|
| 1 | Reactor [L]: | 190 | 190 | 190 | 190 | 190 | 190 |
| 2 | Mixer [RPM]: | 1000 | 1000 | 1000 | 1000 | 1000 | 1000 |
|   | [kW]: | 0.48 | 0.52 | 0.52 | 0.18 | 0.46 | 0.52 |
|   | $P/V_R$ [W/L]: | 2.54 | 2.76 | 2.75 | 0.93 | 2.44 | 2.76 |
|   | $P/Flow_{susp}$ [Wh/L]: | 51 | 55 | 55 | 19 | 49 | 55 |
| 3 | T [° C.]: | 50 | 50 | 50 | 50 | 50 | 50 |
| 4 | Circulation [m³/h]: | 10 | 10 | 10 | 10 | 10 | 10 |
| 5 | Metal salt solution [g/h]: | 11223 | 22446 | 22446 | 6328 | 6328 | 21298 |
|   | Ni [g/L]: | 79.9 | 79.9 | 79.9 | 79.9 | 79.9 | 98.4 |
|   | Co [g/L]: | 20.1 | 20.1 | 20.1 | 20.1 | 20.1 | 1.69 |
|   | Zn [g/L]: | 0.00 | 0.00 | 0.00 | 0.00 | 0.00 | 6.75 |
| 6 | Aqueous alkali [g/h]: | 7746 | 16148 | 16572 | 4367 | 4367 | 16033 |
|   | NaOH [g/L]: | 200 | 200 | 200 | 200 | 200 | 200 |
| 7 | Ammonium [g/h]: | 731 | 1492 | 1512 | 412 | 412 | 1434 |
|   | $NH_3$ [g/L]: | 225 | 225 | 225 | 225 | 225 | 225 |
| 8 | VE water [g/h]: | 0 | 0 | 0 | 0 | 0 | 0 |
| 12 | Mother liquor [g/h]: | 8154 | 27556 | 28012 | 0 | 0 | 26202 |
|   | NaOH [g/L]: | 4.8 | 8 | 10 | 4.8 | 4.8 | 8 |
|   | $NH_3$ [g/L]: | 11 | 11 | 11 | 11 | 11 | 11 |
| 9 | Suspension [g/h]: | 11545 | 12529 | 12518 | 11107 | 11107 | 12563 |
|   | Solid [g/L]: | 150 | 300 | 300 | 85 | 85 | 300 |
|   | Dwell time [h]: | 20 | 20 | 20 | 20 | 20 | 20 |
|   | Product quantity [kg]: | 34.4 | 68.5 | 68.7 | 19.3 | 19.3 | 68.5 |
|   | Residual moisture [%]: | 0.44 | 0.20 | 0.46 | 0.19 | 0.16 | 0.21 |
|   | Ni [%]: | 50.5 | 50.7 | 50.3 | 50.8 | 50.6 | 58.3 |
|   | Co [%]: | 12.8 | 12.4 | 12.9 | 12.7 | 12.7 | 1.0 |
|   | Zn [%]: |  |  |  |  |  | 4.1 |
|   | $d_{10}$ [μm]: | 1.4 | 0.8 | 0.7 | 5.8 | 4.6 | 0.5 |
|   | $d_{50}$ [μm]: | 4.9 | 4.2 | 2.6 | 14.8 | 11.1 | 2.2 |
|   | $d_{90}$ [μm]: | 9.7 | 8.6 | 5.4 | 26.2 | 19.9 | 4.8 |
|   | $d_{90}/d_{50}$: | 1.98 | 2.02 | 2.08 | 1.77 | 1.79 | 2.18 |
|   | Tap density KD [g/cm³]: | 2.22 | 2.18 | 2.17 | 2.28 | 2.24 | 2.11 |
|   | $KD/d_{50}$ [g/cm³ * μm]: | 0.45 | 0.51 | 0.83 | 0.15 | 0.20 | 0.97 |
|   | BET [m²/g]: | 7.3 | 6.4 | 12.8 | 14.9 | 9.2 | 13.8 |

Figure 2:
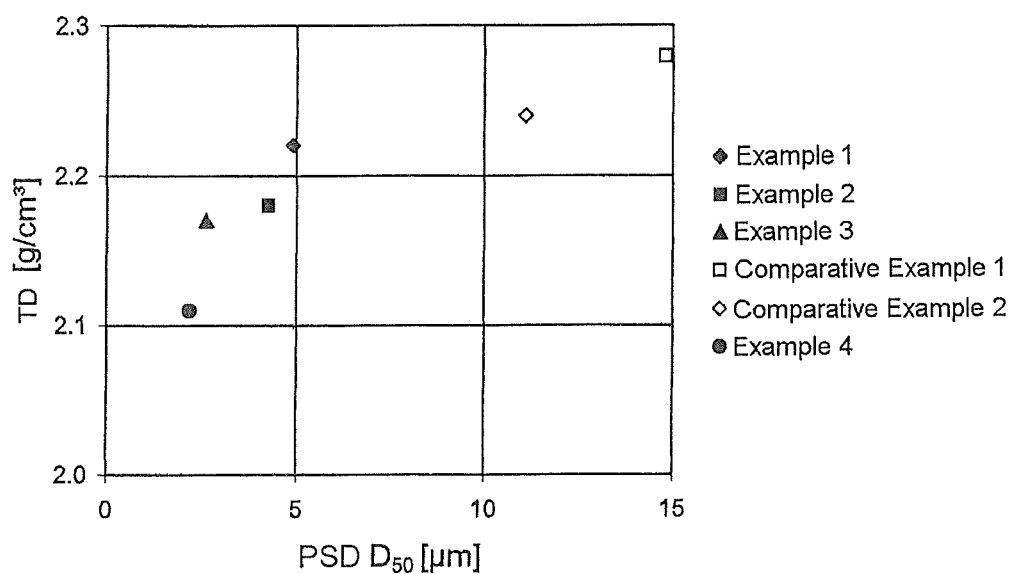
FIG. 2 shows the tap density of the materials prepared in accordance with table 2 against the $d_{50}$ value of the particle size distribution.
Figure 3:
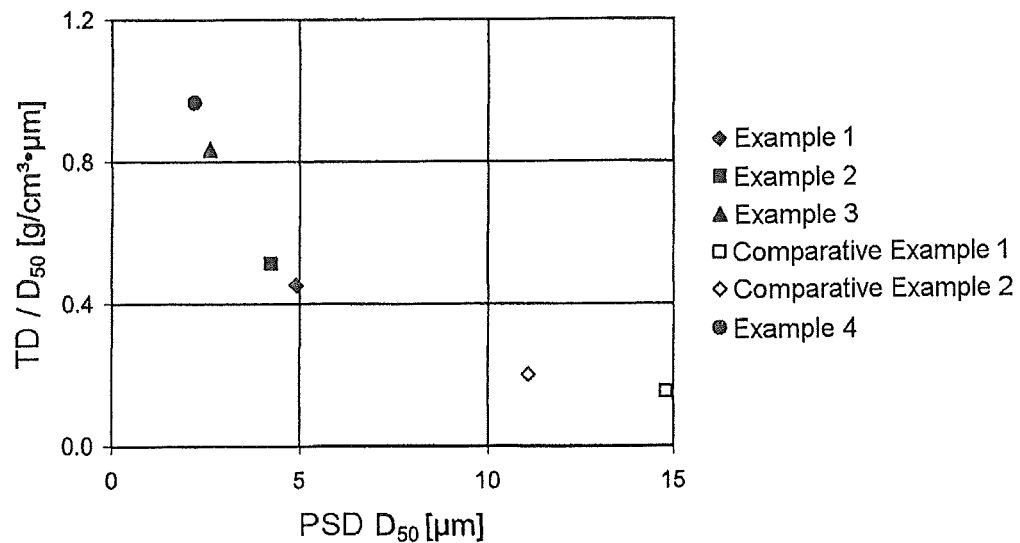
FIG. 3 shows the ratio of tap density to $d_{50}$ value is shown against the $d_{50}$ value.
Figure 4:
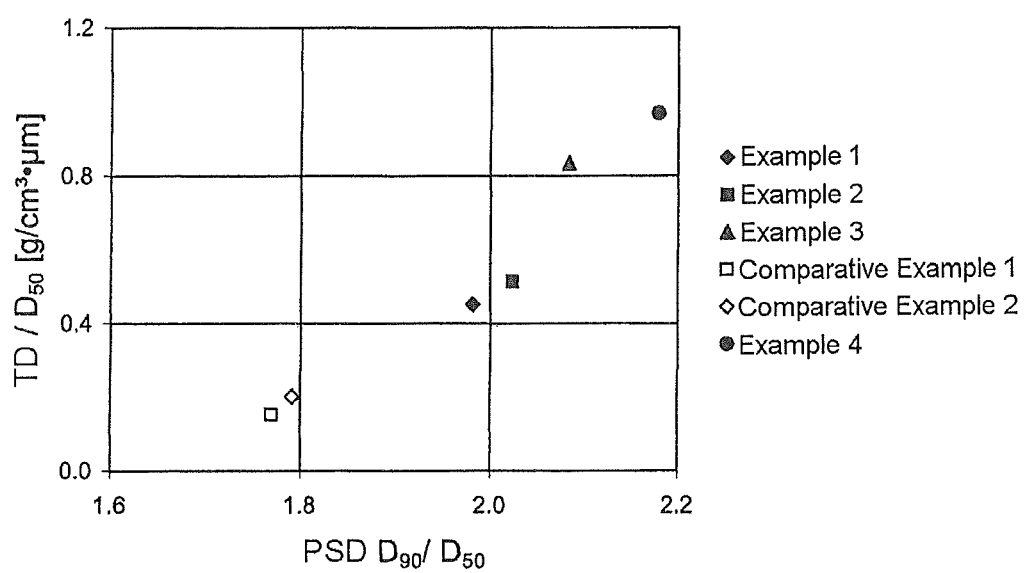
FIG. 4 shows the ratio of tap density and $d_{50}$ value against the ratio of $d_{90}$ value and $d_{50}$ value of the particle size distribution.

FIG. 2 shows the tap density of the materials prepared in accordance with table 2 against the $d_{50}$ value of the particle size distribution. It becomes obvious that the tap density is also reduced with a reduction of the $d_{50}$ value. However, the tap density remains on a high level with >2.1 g/cm³. One reason for the aforementioned can be found in the spheroidicity that is high for these small particles, as shown also in the SEM images in FIG. 5 for example 1, in FIG. 6 for example 2, and in FIG. 7 for example 3. In FIG. 3, the ratio of tap density to $d_{50}$ value is shown against the $d_{50}$ value. It is increased extremely strong with a reduction of the $d_{50}$ value, because the tap density of the powdery compounds in accordance with the invention is reduced only to a very low extent with the $d_{50}$ value. Ultimately, FIG. 4 shows the ratio of tap density and $d_{50}$ value against the ratio of $d_{90}$ value and $d_{50}$ value of the particle size distribution. It shows a nearly linear behaviour with a strong positive increase. Thus, this means that the width of particle size distribution, representing the ratio $d_{90}/d_{50}$, has such effects on the packing density of the materials that broader particle size distributions will result in higher packing densities. However, high packing densities alone are not sufficient for high tap densities. The very particles have to be characterised by a sufficient density themselves, i.e. their inner porosity must not be too high. When looking at table 2 you will see that the BET surface of the powders in accordance with the invention may be higher than 10 m³/kg and that the porosity is increased in such a strong manner obviously that the aforementioned results in adverse effects on the tap density. On the basis of this you can conclude that the powders in accordance with the invention are characterised by very fine pores with small diameters and high surface areas, but that the very pore volume is relatively small. In order to achieve the high specific surface area with these fine pores, the length and number of the same have to be particularly high. Thus, the powders in accordance with the invention are suited particularly advantageously for being used in nickel metal hydride batteries where high volumetric capacity and simultaneously quick charging and discharging procedures are required. This is the case particularly during the use of nickel metal hydride batteries in electric vehicles and hybrid vehicles. The characteristic features of the powdery compounds in accordance with the invention such as small particle size, very broad particle size distribution, high ratio of tap density/$d_{50}$ value, and high tap densities despite of comparatively high BET values, result from the combination of large aqueous alkali excesses (>0.12 mol/L), high solid concentrations, and high mechanic power input. By adapting these procedural parameters, powdery compounds in accordance with the invention with tap densities of >2.3 g/cm³ or even >2.4 g/cm³ are produced for particle sizes with $d_{50}$ values of >3 μm. In this, the ratio of tap density to $d_{50}$ value even reaches values higher than 1.0.

The invention claimed is:

1. A powder compound of the formula $Ni_aM_bO_x(OH)_y$, wherein M represents Co and at least one element selected from the group consisting of Fe, Zn, Al, Sr, Mg, Ca and mixtures thereof, wherein $0.6 \leq a < 1.0$, $0 < b \leq 0.4$, $0 < x \leq 0.60$, and $1.4 \leq y < 2$, wherein the powder compound has a particle size distribution $d_{50}$ value, measured in accordance with ASTM B 822, of <5 μm, and wherein a ratio of tap density, measured in accordance with ASTM B 527, to the particle size distribution $d_{50}$ value is at least 0.4 g/cm³*μm and has a BET surface area, measured in accordance with ASTM D 3663, of at least 5 m²/g.

2. The powder compound according to claim 1, wherein the particle size distribution $d_{50}$ value is <3 μm.

3. The powder compound according to claim 1, wherein the ratio of tap density to the particle size distribution $d_{50}$ value is at least 0.6 g/cm³*µm.

4. The powder compound according to claim 1, wherein the ratio of tap density to the particle size distribution $d_{50}$ value is at least 0.8 g/cm³*µm.

5. The powder compound according to claim 1, having a BET surface area, measured in accordance with ASTM D 3663, of at least 10 m²/g.

6. The powder compound according to claim 1, having a standardized width of grain size distribution of at least 2.0, defined as the ratio $d_{90}/d_{50}$, wherein d stands for the diameter of the powder particles.

7. The powder compound according to claim 1, wherein the powder comprises particles having a spheroid shape.

8. The powder compound according to claim 1, wherein the powder comprises particles having a form factor of ≥0.8.

9. The powder compound according to claim 1, wherein the powder comprises particles having a form factor of ≥0.9.

10. The powder compound according to claim 1, having a BET surface area, measured in accordance with ASTM D 3663, of at least 5 m²/g, wherein the ratio of tap density to the particle size distribution $d_{50}$ value is at least 0.6 g/cm³*µm, wherein the powder comprises particles having a spheroid shape having a standardized width of grain size distribution of at least 1.8, defined as the ratio $d_{90}/d_{50}$, wherein d stands for the diameter of the powder particles and having a form factor of ≥0.8.

11. An active material for nickel metal hydride batteries comprising a powder compound according to claim 1 as active material for nickel metal hydride batteries.

12. A nickel metal hydride battery comprising an active material according to claim 11.

13. A lithium compound for a secondary lithium battery, the compound prepared from a precursor powder compound according to claim 1.

14. A powder compound of the formula $Ni_aM_bO_x(OH)_y$, wherein M represents Co and at least one element selected from the group consisting of Fe, Zn, Al, Sr, Mg, Ca and mixtures thereof, wherein 0.6≤a<1.0, 0<b≤0.4, 0<x≤0.60, and 1.4≤y<2, wherein the powder compound has a particle size distribution $d_{50}$ value, measured in accordance with ASTM B 822, of <5 µm, and wherein a ratio of tap density, measured in accordance with ASTM B 527, to the particle size distribution $d_{50}$ value is at least 0.4 g/cm³*µm and having a standardized width of grain size distribution of at least 1.8, defined as the ratio $d_{90}/d_{50}$, wherein d stands for the diameter of the powder particles.

15. A powder compound of the formula $Ni_aM_bO_x(OH)_y$, wherein M represents a mixture of Co, Mn and Fe, wherein 0.6≤a<1.0, 0<b≤0.4, 0<x≤0.60, and 1.4≤y<2, wherein the powder compound has a particle size distribution $d_{50}$ value, measured in accordance with ASTM B 822, of <5 µm, and wherein a ratio of tap density, measured in accordance with ASTM B 527, to the particle size distribution $d_{50}$ value is at least 0.4 g/cm³*µm and has a BET surface area, measured in accordance with ASTM D 3663, of at least 5 m²/g.

16. A process for producing a powder compound of the formula $Ni_aM_bO_x(OH)_y$, wherein M represents Co and at least one element selected from the group consisting of Fe, Zn, Al, Sr, Mg, Ca and mixtures thereof, wherein 0.6≤a<1.0, 0<b≤0.4, 0<x≤0.60, and 1.4≤y<2, wherein the powder compound has a particle size distribution $d_{50}$ value, measured in accordance with ASTM B 822, of <5 µm, and wherein a ratio of tap density, measured in accordance with ASTM B 527, to the particle size distribution $d_{50}$ value is at least 0.4 g/cm³, the process comprising:

(a) providing at least one first reactant solution comprising one or more chlorides, sulfates and/or nitrates of Co and the at least one element selected from the group consisting of Fe, Zn, Al, Sr, Mg, Ca and mixtures thereof, and at least one second reactant solution comprising an alkali compound;

(b) combining the at least one first reactant solution and the at least one second reactant solution in a reactor, providing a specific mechanic power input of at least 2 Watts/liter to the combined solutions to generating a homogeneous mixed reaction zone and form a product suspension including insoluble product and a mother liquor supersaturated on the basis of the adjustment of the liquor excess with a liquor excess of at least 0.12 mol/L;

(c) partially separating the mother liquor from the insoluble product to provide a solid contents of at least 150 g/L within the suspension and (d) drying the insoluble product.

17. The process according to claim 16, wherein the solid contents within the suspension is at least 225 g/L.

18. The process according to claim 16, wherein the solid contents within the suspension is at least 300 g/L.

19. The process according to claim 16, wherein the concentration of the aqueous alkali is at least 0.25 mol/L.

20. The process according to claim 16, wherein the specific mechanic power input is at least 2.5 W/L.

* * * * *

UNITED STATES PATENT AND TRADEMARK OFFICE
CERTIFICATE OF CORRECTION

PATENT NO.       : 8,545,794 B2                                    Page 1 of 1
APPLICATION NO. : 12/682707
DATED            : October 1, 2013
INVENTOR(S)      : Jahn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 607 days.

Signed and Sealed this

Fifteenth Day of September, 2015

Michelle K. Lee
*Director of the United States Patent and Trademark Office*